United States Patent Office 3,346,406
Patented Oct. 10, 1967

3,346,406
PAPER COATING COLOR COMPOSITIONS
Ian C. MacGugan, Trenton, and Herbert P. Trix, Grosse Ile, Mich., assignors to Wyandotte Chemicals Corporation, Wyandotte, Mich., a corporation of Michigan
No Drawing. Filed Apr. 15, 1965, Ser. No. 448,256
12 Claims. (Cl. 106—124)

ABSTRACT OF THE DISCLOSURE

The use of certain heteric-type polyols along with a pigment and an adhesive provides paper coating color compositions which significantly improve the physical properties and performance characteristics of paper. Paper coated with these compositions exhibits marked improvements in gloss, printability, and smoothness.

---

This invention relates to paper coating color compositions. More particularly, this invention relates to the use of certain heteric-type polyols as paper coating color additives whereby substantial improvements are obtained in gloss, printability and smoothness of paper coated with the novel compositions.

Coated paper has found several applications in industry today. The improvement in appearance of paper when coated has contributed to increased paper sales. Furthermore, improved opacity, smoothness and ink receptivity allow the use of paper in many applications which previously were closed to uncoated paper.

The mixture of pigments, adhesives and other additives that is applied to paper as a coating is popularly termed in the paper industry as a "coating color." Paper coating colors basically consist of a pigment such as clay, titanium dioxide or calcium carbonate and an adhesive such as starch or protein. However, few coating colors are made from pigments and adhesives alone. Many other materials are added during preparation of the coating colors or at a later stage in the coating operation. These materials include defoamers, plasticizers, and other types of paper additives.

This invention relates to a paper coating color additive generally considered by the industry to be a lubricant. Although there are many products employed in the paper industry as lubricants, they all have various shortcomings, particularly in the effect they have on the properties of the coated paper. Furthermore, the normal lubricants have a tendency to increase the coating color viscosity which seriously hampers the coating operation.

Now, in accordance with this invention, it has been found that certain heteric-type polyols perform particularly well as coating color lubricants. These polyols improve the coating color viscosity and give better smoothness, impart high ink receptivity and, above all, improve the gloss of coated paper.

The heteric-type polyols which are employed in accordance with this invention are those compounds which have a "conjugated" or block polymer structure employing a hydrophobic oxyalkylene chain or chains as the nucleus and being characterized by having a heteric oxyethylene chain or chains attached to the hydrophobic oxyalkylene chain. A distinguishing feature of these compounds is the heteric oxyethylene chain or chains which are composed of oxyethylene groups having defined proportions of different and higher molecular weight oxyalkylene groups randomly distributed throughout the hydrophilic oxyethylene chain. Thus, there are two elements which comprise the heteric-type polyols which may be employed in accordance with this invention, a hydrophobic element and a hydrophilic element.

The hydrophobic element is a polyoxyalkylene polymer in which at least most of the individual oxyalkylene groups contained therein have at least three carbon atoms in their structure. An essential characteristic of the hydrophobic element of the new compounds is that the total hydrophobic alkylene oxide ingredient therein has an average oxygen/carbon atom ratio of not greater than 0.40. Since oxypropylene groups have an oxygen/carbon atom ratio of 0.33, the oxyalkylene ingredient used in making the hydrophobic portion of the compositions can be propylene oxide or mixtuers thereof with ethylene oxide or butylene oxide or other higher molecular weight alkylene oxides with the proportions used being such that the oxygen/carbon atom ratio does not exceed 0.40.

The hydrophilic elements of these compounds are polymeric chains of oxyethylene groups having higher molecular weight oxyalkylene groups which contain at least three carbon atoms in their structure randomly and intermittently distributed therein. Since the oxypropylene group is the group most frequently incorporated in the hydrophilic chain with the oxyethylene groups, henceforth, for the sake of convenience in description, such hydrophilic chains are referred to, at times, simply as heteric polyoxyethylene-polyoxypropylene chains. It will be recognized, however, that wherever this term is used other higher oxyalkylene groups such as the oxybutylene group, the oxyamylene and the oxystyrene group, may be used in lieu of the oxypropylene group.

These conjugated polyoxyalkylene compounds are prepared by first condensing the hydrophobic alkylene oxide ingredient, described above, having an average oxygen/carbon atom ratio of not greater than 0.40 with a lower molecular weight aliphatic polyhydric alcohol having from two to six carbon atoms per molecule to prepare a hydrophobic polyoxyalkylene intermediate having a molecular weight of at least about 400 to 900, and subsequently condensing therewith a mixture of ethylene oxide and a higher molecular weight alkylene oxide. The mixture of ethylene oxide and higher molecular weight alkylene oxide employed should contain at least about five weight percent of the higher molecular weight alkylene oxide but must have an average oxygen/carbon atom ratio of greater than 0.40. The conjugated polyoxyalkylene compounds of this invention conform to the following generic formula:

$$Y(-P-E-H)_x$$ 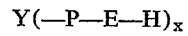

wherein Y is the nucleus of an aliphatic polyhydric alcohol having $x$ hydroxyl groups and having up to six, inclusive, carbon atoms, $x$ is at least two, P is a hydrophobic polyoxyalkylene chain having an oxygen/carbon atom ratio of not more than 0.40, the molecular weight of P and the value of $x$ being such that the molecule excluding E has a molecular weight of between 400 and 25,000, and E is a hydrophilic heteric polyoxyalkylene chain which (1) contains oxyethylene groups and at least five percent by weight of higher molecular weight oxyalkylene groups having at least three carbon atoms in their structure, and (2) has an average oxygen/carbon atom ratio of greater than 0.40, E being present in the composition to the extent that it constitutes from 5 to 90 weight percent of the total composition.

The heteric-type polyols which are preferably employed in this invention are those which are prepared by condensing a polyhydric alcohol with a hydrophobic ingredient containing from 70 to 100 weight percent propylene oxide and from 30 to 0 weight percent ethylene oxide to obtain a condensation product having a molecular weight of from 500 to 4000 and further condensing the first-obtained product with a hydrophilic ingredient containing from 70 to 95 weight percent ethylene oxide and from 30 to 5 weight percent propylene oxide to obtain a heteric polyol having a molecular weight of from 1500 to 8000. A particularly preferred polyol is one prepared by condensing a mixture of 90 weight percent propylene oxide and 10 weight percent ethylene oxide with trimethylolpropane to obtain a condensation product having a molecular weight of 2700 and further condensing this first-obtained product with a mixture of 90 weight percent ethylene oxide and 10 weight percent propylene oxide to obtain a heteric polyol having a molecular weight of 3600.

Other polyols which are illustrative of those which may be employed in this invention include:

(1) a 3720 molecular weight polyol prepared by condensing a mixture of ethylene oxide and propylene oxide in a weight ratio of ethylene oxide to propylene oxide of 9:1 with a 2045 molecular weight condensation product of propylene glycol and a mixture of propylene oxide and ethylene oxide in a weight ratio of propylene oxide to ethylene oxide of 7:3, (2) a 1500 molecular weight polyol prepared by condensing a mixture of ethylene oxide and propylene oxide in a weight ratio of ethylene oxide to propylene oxide of 9:1 with a 1125 molecular weight condensation product of propylene glycol and a mixture of propylene oxide and ethylene oxide in a weight ratio of propylene oxide to ethylene oxide of 9:1, (3) an 8000 molecular weight polyol prepared by condensing a mixture of ethylene oxide and propylene oxide in a weight ratio of ethylene oxide to propylene oxide of 7:3 with a 2800 molecular weight condensation product of pentaerythritol and propylene oxide, (4) a 6000 molecular weight polyol prepared by condensing a mixture of ethylene oxide and propylene oxide in a weight ratio of ethylene oxide to propylene oxide of 9:1 with a 4000 molecular weight condensation product of 1,5-pentanediol and propylene oxide, (5) a 2050 molecular weight polyol prepared by condensing a mixture of ethylene oxide and propylene oxide in a weight ratio of ethylene oxide to propylene oxide of 80/20 with an 800 molecular weight condensation product of butylene glycol and propylene oxide, and (6) a 2500 molecular weight polyol prepared by condensing a mixture of ethylene oxide and butylene oxide in a weight ratio of ethylene oxide to butylene oxide of 9:1 with a 500 molecular weight condensation product of trimethylolpropane and propylene oxide.

The compounds of this invention are prepared by condensing a mixture of ethylene oxide and a higher molecular weight alkylene oxide having at least three carbon atoms in its structure with the hydrophobic polyoxyalkylene intermediate in an amount sufficient to constitute 5 to 90 percent by weight of the resultant product. The mixture of ethylene oxide and higher molecular weight alkylene oxide employed in the hydrophilic portion of the compounds of this invention must continue at least five percent, by weight, of the higher molecular weight alkylene oxide and have an average oxygen/carbon atom ratio of greater than 0.40.

In preparing the hydrophobic polyoxyalkylene intermediate, the condensation of propylene oxide, for example, with the polyhydric alcohol is normally carried out at elevated temperatures and pressures in the presence of an alkaline catalyst such as a sodium alkoxide, a quaternary ammonium base, or preferably sodium hydroxide. Similarly, the condensation reaction may be carried out in the presence of acid catalysts as set forth in U.S. Patent No. 2,510,540. A complete description of the heteric-type polyols employed in accordance with this invention and methods for their preparation may be found in U.S. Patent No. 3,101,374.

The lower molecular weight aliphatic polyhydric alcohols having from two to six carbon atoms per molecule which may be employed in the preparation of the heteric-type polyols include ethylene glycol, propylene glycol, the various isomeric butylene glycols, 1,5-pentanediol, 1,6-hexanediol, glycerol, trimethylolpropane, sorbitol, pentaerythritol and sucrose. Since the alcohol constitutes only a small proportion of the total composition, it ordinarily does not have a significant effect on the properties thereof. Accordingly, the particular alcohol is not critical.

In the practice of this invention, the heteric-type polyol is preferably added to the prepared coating color just prior to use in the coating operation. The heteric-type polyol should be thoroughly mixed into the coating color. Alternatively, the heteric-type polyol may be added directly to the coating system at any time prior to the actual coating step.

The amount of heteric-type polyol which is employed in accordance with this invention is from about 0.1% to about 1% by weight based on the weight of the pigment, preferably from about 0.3% to about 0.7%. An excess of polyol should be avoided since the physical properties and performance characteristics of the coated paper suffer adversely when such amounts are employed.

As mentioned above, a paper coating color consists primarily of a pigment and an adhesive. Great latitude in the amounts of each may be used. Generally, however, the amount of adhesive which will be used is from about 5% to about 50% by weight based on the weight of the pigment.

The following examples serve to illustrate the invention. All parts are by weight unless otherwise stated.

EXAMPLES I–IV

The paper coating colors of this invention were prepared in the following manner. A pigment was dispersed in a Read mixer (sigma-blade type) using a dispersant. Following dispersion, an adhesive was added to the pigment slurry and the mixture was thoroughly agitated. The mixture was then pumped past a steam jet cooker where the adhesive was cooked at about 250° F. A heteric-type polyol was then added to the cooked coating color. Table 1 below shows several paper coating color compositions prepared as described.

In the coating operation, the color composition was metered to a coating machine and paper was coated according to the standard procedures. The coated paper was tested according to the following TAPPI standards:

Hunter gloss—T480–M–51
Hunter brightness—T452–M–58 using a Gardner multipurpose reflectometer corrected to GE standard
Opacity—T425–M–60
Wax pick—T459–M–48
Smoothness—T479–SM–48
Ink receptivity—R.C. 19
IGT printability—T499–SU–64.

Table 2 below shows the results of these tests.

*Coating color compositions*

TABLE 1

| Example No. | Pigment | Parts | Adhesive | Parts | Heteric Polyol | Parts | Additives | Parts |
|---|---|---|---|---|---|---|---|---|
| I-a | Clay / CaCO₃ | 75 / 25 | Starch | 10 | A | 1.0 | B | 5 |
| I-b | Clay / CaCO₃ | 75 / 25 | ---do--- | 10 | None | ------- | B | 5 |
| II-a | Clay | 100 | ---do--- | 10 | A | 0.5 | B | 5 |
| II-b | Clay | 100 | ---do--- | 10 | None | ------- | B | 5 |
| III-a | Clay / CaCO₃ | 75 / 25 | ---do--- | 10 | A | 0.5 | B | 5 |
| III-b | Clay / CaCO₃ | 75 / 25 | ---do--- | 10 | A | 0.3 | B | 5 |
| III-c | Clay / CaCO₃ | 75 / 25 | ---do--- | 10 | None | ------- | B | 5 |
| IV-a | Clay / CaCO₃ | 75 / 25 | Casein | 12 | A | 0.7 | B | 5 |
| IV-b | Clay / CaCO₃ | 75 / 25 | ---do--- | 12 | None | ------- | B | 5 |

A—3,600 Molecular weight polyol prepared by condensing a mixture of ethylene oxide (EO) and propylene oxide (PO) in a weight ratio of EO to PO of 9.1 with a 2,700 molecular weight condensation product of trimethylolpropane and a mixture of PO-EO in a weight ratio of PO to EO of 9.1.
B—Dow Latex 512R, a styrene-butadiene latex with a 60/40 ratio of styrene/butadiene.

TABLE 2

| Example No. | Gloss, 75° | Brightness | Opacity, Percent | Wax Pick | Smoothness | Ink Receptivity | IGT Printability |
|---|---|---|---|---|---|---|---|
| I-a | 53.4 | 79.5 | 91.2 | 2A | 696 | 2.87 | 193 |
| I-b | 48.3 | 79.2 | 91.2 | 4A | 624 | 2.56 | 248 |
| II-a | 59.6 | 81.4 | 92.0 | 6A | 326 | 3.04 | (¹) |
| II-b | 53.6 | 80.6 | 91.6 | 6A | 309 | 2.75 | (¹) |
| III-a | 58.6 | 81.4 | 92.8 | 4A | 436 | 3.14 | 210 |
| III-b | 58.2 | 81.3 | 92.7 | 4A | 453 | 2.92 | 290 |
| III-c | 51.3 | 81.2 | 92.9 | 6A | 373 | 2.77 | 200 |
| IV-a | 54.3 | 82.3 | 92.4 | 7A | 421 | 2.82 | 290 |
| IV-b | 46.3 | 81.9 | 92.1 | 7A | 375 | 2.47 | 210 |

¹ Test not conducted.

EXAMPLES V–XII

In the following examples, paper coating colors were prepared using various different additives, some of which are similar to the heteric-type polyols of this invention while others are standard commercial products. The basic formulation comprised 25 parts of clay, 25 parts of calcium carbonate, 10 parts of starch and 5 parts of Dow Latex 512R along with certain amounts, listed below, of additives. The compositions were prepared as described in the previous examples. The coated papers were tested following standard procedure and the results appear in Table 3.

Table 3 demonstrates the superiority of the heteric-type polyols of this invention over numerous other compounds. No other compound tested can match the over-all properties of the paper coated with these polyols, especially the combined properties of gloss, smoothness and printability.

We claim:
1. A paper coating color composition comprising a pigment, an adhesive and from about 0.1% to about 1% by weight based on the weight of the pigment of a heteric-type polyol having a molecular weight of from 1500 to 8000 having the general formula:

$$Y(-P-E-H)_x$$

wherein Y is the nucleus of an aliphatic polyhydric al-

TABLE 3

| Example No. | Additive, Parts | Gloss, 75° | Brightness | Opacity, Percent | Wax Pick | Smoothness | Ink Receptivity | IGT Printability |
|---|---|---|---|---|---|---|---|---|
| V | None | 42.0 | 80.3 | 91.9 | 3A | 224 | 3.40 | 290 |
| VI | A, 0.3 | 47.8 | 80.7 | 91.9 | 3A | 240 | 3.66 | 340 |
| VII | B, 0.5 | 45.4 | 80.5 | 92.0 | 3A | 231 | 3.59 | 480 |
| VIII | C, 0.5 | 41.4 | 80.1 | 92.1 | 4A | 219 | 3.30 | 260 |
| IX | D, 0.5 | 41.4 | 73.6 | 93.6 | 3A | 225 | 3.56 | 270 |
| X | E, 0.5 | 42.4 | 79.0 | 93.4 | 2A | 178 | 3.66 | 310 |
| XI | F, 0.5 | 43.2 | 81.8 | 93.1 | 2A | 239 | 3.69 | 240 |
| XII | G, 0.5 | 42.2 | 81.1 | 93.2 | 3A | 229 | 3.38 | 260 |

A—3,600 molecular weight polyol prepared by condensing a mixture of ethylene oxide (EO) and propylene oxide (PO) in a weight ratio of EO to PO of 9:1 with a 2,700 molecular weight condensation product of trimethylolpropane and a mixture of PO-EO in a weight ratio of PO to EO of 9:1.
B—2,500 molecular weight polyol prepared by condensing a mixture of ethylene oxide (EO) and propylene oxide (PO) in a weight ratio of EO to PO of 85/15 with a 500 molecular weight condensation product of trimethylolpropane with propylene oxide.
C—6,600 molecular weight heteric prepared by condensing a 75/25 by weight EO-PO mixture with trimethylolpropane.
D—Calcium stearate.
E—Pluronic L62—2,500 molecular weight Pluronic polyol prepared by condensing EO with a 1,750 molecular weight hydrophobic condensation product of propylene glycol and propylene oxide.
F—Pluronic L81—2,700 molecular weight Pluronic polyol prepared by condensing EO with a 2,250 molecular weight hydrophobic condensation product of propylene glycol and propylene oxide.
G—Alkyl benzene sulfonate.

cohol having $x$ hydroxyl groups and having up to six, inclusive, carbon atoms, $x$ is at least two, P is a hydrophobic polyoxyalkylene chain having an oxygen/carbon atom ratio of not more than 0.40, the molecular weight of P and the value of $x$ being such that the molecule excluding E has a molecular weight of between 500 and 4000, and E is a hydrophilic heteric polyoxyalkylene chain which (1) contains oxyethylene groups and at least five percent by weight of higher molecular weight oxyalkylene groups having at least three carbon atoms in their structure, and (2) has an average oxygen/carbon atom ratio of greater than 0.40, E being present in the composition to the extent that it constitues from 5 to 90 weight percent of the total compositon.

2. A composition of claim 1 when the amount of heteric-type polyol is from about 0.3% to about 0.7% by weight based on the weight of the pigment.

3. A composition of claim 1 when the heteric-type polyol is a product prepared by condensing a polyhydric alcohol with a hydrophobic ingredient containing from 70 to 100 weight percent propylene oxide and from 30 to 0 weight percent ethylene oxide to obtain a condensation product having a molecular weight of from 500 to 4000 and further condensing the first-obtained product with a hydrophilic ingredient containing from 70 to 95 weight percent ethylene oxide and from 30 to 5 weight percent propylene oxide to obtain a heteric polyol having a molecular weight of from 1500 to 8000.

4. A Composition of claim 1 when the heteric-type polyol is a product prepared by condensing a mixture of 90 weight percent propylene oxide and 10 weight percent ethylene oxide with trimethylolpropane to obtain a condensation product having a molecular weight of 2700 and further condensing this first-obtained product with a mixture of 90 weight percent ethylene oxide and 10 weight percent propylene oxide to obtain a heteric polyol having a molecular weight of 3600.

5. In a process for the color coating of paper, the improvement which comprises employing as a paper coating color a composition of claim 1.

6. In a process for the color coating of paper, the improvement which comprises employing as a paper coating color a composition of claim 2.

7. In a process for the color coating of paper, the improvement which comprises employing as a paper coating color a composition of claim 3.

8. In a process for the color coating of paper, the improvement which comprises employing as a paper coating color a composition of claim 4.

9. Paper coated with a composition of claim 1.
10. Paper coated with a composition of claim 2.
11. Paper coated with a composition of claim 3.
12. Paper coated with a composition of claim 4.

References Cited
UNITED STATES PATENTS

| | | | |
|---|---|---|---|
| 2,510,540 | 6/1950 | Ballard et al. | 260—615 |
| 2,677,700 | 5/1954 | Jackson | 106—208 |
| 2,933,406 | 4/1960 | Salzberg | 106—138 |
| 3,101,374 | 8/1963 | Patton | 260—584 |

ALEXANDER H. BRODMERKEL, *Primary Examiner.*

T. MORRIS, *Assistant Examiner.*